April 1, 1930.  C. G. EDWARDS  1,752,899
COUNTER THRUST PRESSURE MOTOR
Filed April 11, 1928   2 Sheets-Sheet 1
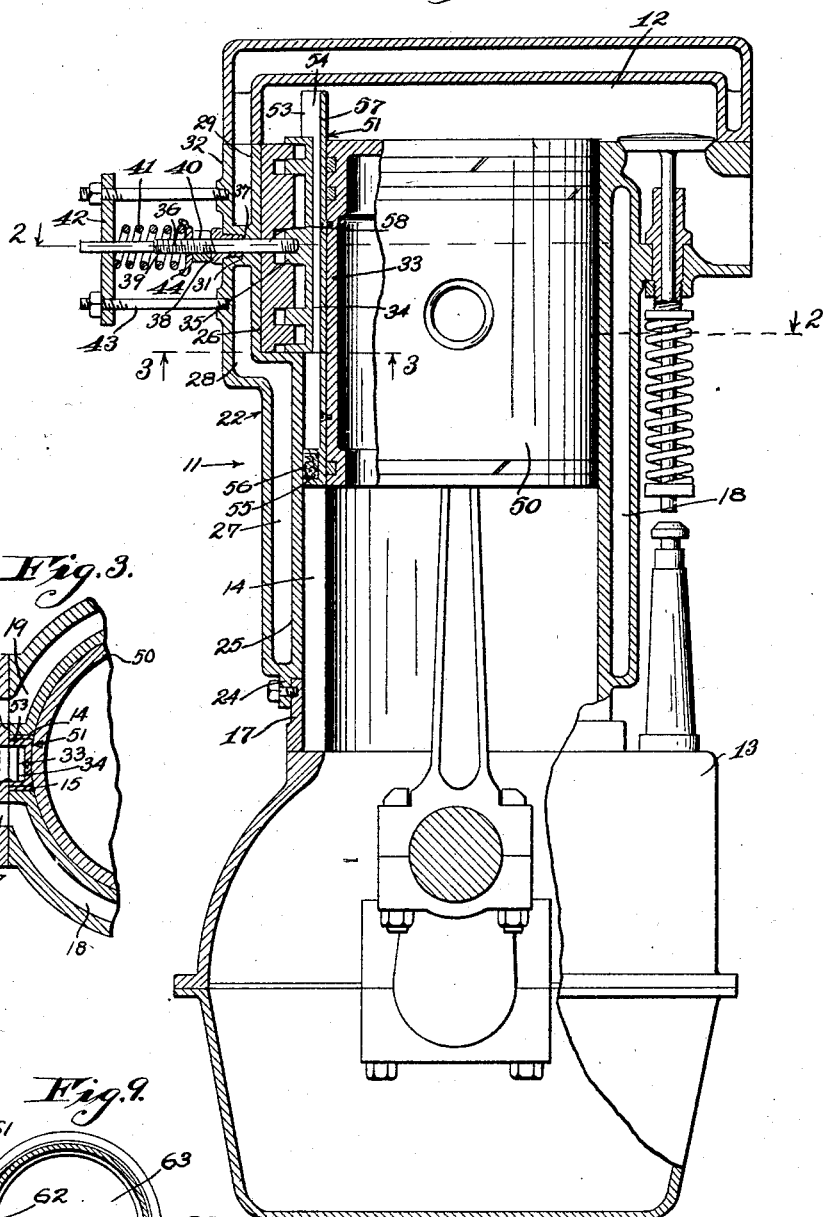
Fig.1.
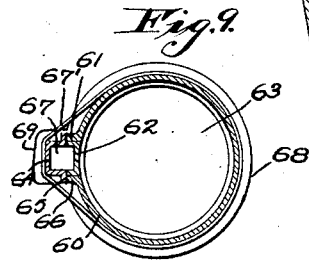
Fig.3.
Fig.9.
Inventor
Clarence G. Edwards
by Hazard and Miller
Attorneys April 1, 1930.  C. G. EDWARDS  1,752,899
COUNTER THRUST PRESSURE MOTOR
Filed April 11, 1928    2 Sheets-Sheet 2
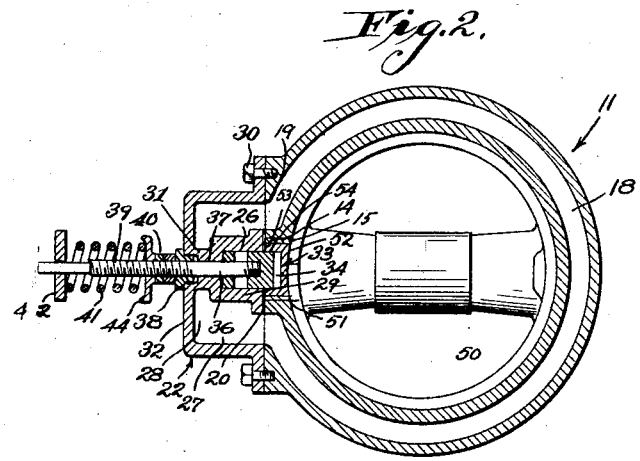
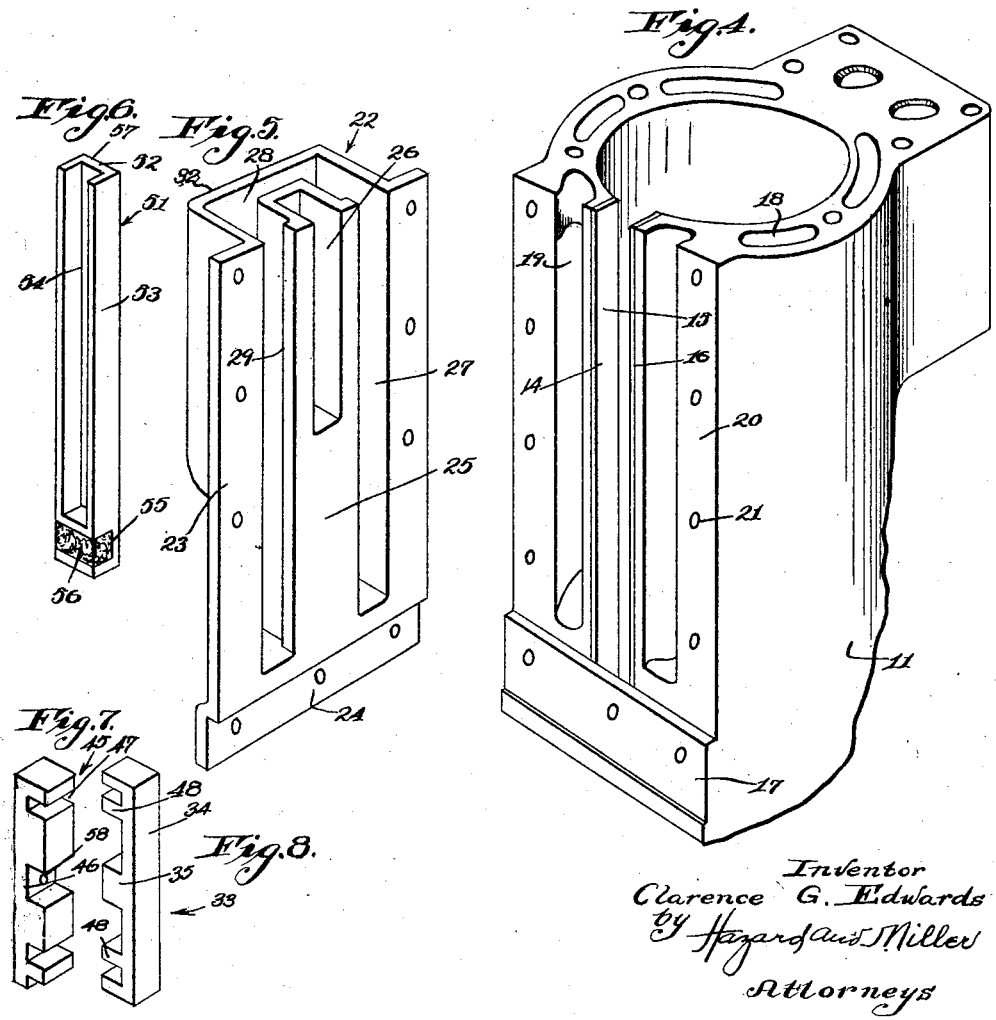
Inventor
Clarence G. Edwards
by Hazard and Miller
Attorneys Patented Apr. 1, 1930

1,752,899

UNITED STATES PATENT OFFICE

CLARENCE G. EDWARDS, OF LOS ANGELES, CALIFORNIA

COUNTER-THRUST PRESSURE MOTOR

Application filed April 11, 1928. Serial No. 269,087.

My invention is a counter thrust pressure motor of a type disclosed in my patent applications, Serial No. 111,297, filed May 24, 1926, having matured into Patent No. 1,678,424, July 24, 1928, and 233,140, filed November 14, 1927, having matured into Patent No. 1,701,322, February 5, 1929.

An object of my present invention is in a counter thrust motor of the type above mentioned to provide a more efficient cooling system to carry away the heat developed by the hot gases passing along the side of the cylinder and piston.

In a counter thrust motor such as I have developed the pressure of the exploded gases on the top of the piston passes into a channel in the side of the cylinder and counteracts the side or angular thrust of the piston against the cylinder due to the angularity of the connecting rod from the wrist pin to the crank shaft during the power stroke of the engine. This action of the hot exploded gases communicates considerable heat to the walls of the cylinder and to the piston. The effectual cooling of this channel and the various parts associated therewith is one of the objects of the present invention.

Another object of my invention is in a counter thrust motor to utilize a spring pressure device to react to the pressure developed by the gases giving a relatively large passage in the channel of the cylinder under high pressure and decreasing this passage under comparatively low pressure. Therefore, by this construction, during the time of excessively high pressure due to the explosion in the cylinder, the gate-like block restricting the passage in the channel is forced outwardly allowing some gas to bear against the side of the piston and hence more effectively counteracting the side pressure.

My invention will be more readily understood from the following description and drawings, in which:
Fig. 1 is a vertical section through an engine of a water cooled type, illustrating certain features of my invention, Fig. 2 is a horizontal section on the line 2—2 of Fig. 1 in the direction of the arrows, Fig. 3 is a partial horizontal section taken on the line 3—3 of Fig. 1 in the direction of the arrows, Fig. 4 is a perspective view of the engine cylinder showing the channel in the cylinder for the closure block on the piston, and illustrating the water passages, Fig. 5 is a perspective view of the side cover of a cylinder to enclose the channel and water passages, Fig. 6 is a perspective view of the channel-like closure block for attachment to the piston, Fig. 7 is a perspective view of the fixed block fitting in the channel or recess of the cover,

Fig. 8 is a perspective view of the elongated movable gate engaging with the fixed block, Fig. 9 is a cross section of an air-cooled type of engine showing the manner of securing the removable cover in position.

In the construction shown the engine cylinder is designated generally by the numeral 11 which has a cylinder head 12 connected thereto and a crank case 13 at the bottom. The cylinder has a longitudinal slot 14 formed in one of the side walls. This slot has removable wear faces 15 thereon secured in position in any suitable manner.

The faces 15 at each side of the slot are preferably on the same level. A cross plate 17 on the cylinder forms a closure for the lower end of the slot. The cylinder is provided with a hollow space 18 for the water jacket, this hollow space having lateral elongated openings 19 on each side of the slot 14. The outer portion of the cylinder has flattened surfaces 20 with bolt holes 21 on each side of the water jacket section. These surfaces 20 are preferably on a plane with the surfaces 16.

The side cover 22 has vertical flanges 23 adapted to fit on the surfaces 24 and with a cross recess at the bottom 24 adapted to fit over the palte 17. There is a central web 25 which fits against the surfaces 16, this having a deep channel or recess 26 formed therein at the upper part of the cover to hold the gate as hereunder described. This construction leaves spaces 27 which register with the openings 19 in the water jacket and there is a passage 28 completely around the central structure 29 which has the web 25 and the channel 26 formed therein. The cover is secured in place by bolts 30. A neck 31 connects the central structure 29 with the outer wall 32 of the cover.

The gate designated generally by the numeral 33 has a surface 34 adapted to extend towards the piston. There is a central lug 35 to which is connected a stem 36, this stem passing through an opening 37 in the neck 31 and through a packing gland 38 which is made leak proof. This stem 36 is screw threaded as indicated at 39 and has lock nuts 40 thereon. A spring 41 surrounds the stem and bears against the plate 42 held in position on the cover by bolts 43 and a washer 44 bearing against the nuts 40.

In Fig. 7 I show a fixed block 45 which has a web section 46 to fit in the base of the channel or recess 26. This block has a plurality of cross slots 47 which engage tongues 48 on the gate 33. There is also a wide cross slot 49 in the block 45 to engage the central lug 35 on the gate.

The piston 50 has a channel-shaped hanger 51 attached thereto (note particularly Figs. 1, 2, 3 and 6). This hanger has a web portion 52 conforming to the cylindrical shape of the piston with flanges 53 extending outwardly, thereby leaving an elongated channel 54. There is a cross channel 55 at the bottom with packing material 56 fitted therein, this packing material being adapted to bear against the surfaces 25 of the cover and the sides 15 of the slot 14 and prevent downward passage of gas. The upper end 57 of the hanger is adapted to extend above the piston.

The block 45 is fitted in the channel or recess 26 of the cover 22 in such manner as to be immovable therein, and this block has a perforation 58 to allow passage of the stem 36 connected to the gate 33. The sides 53 of the hanger 51 are adapted to bear on the surfaces 15 of the slot 14 of the cylinder and the gate 33 fits in the channel 54 of this hanger. The normal position of the gate is with this pressed substantially to the base of the channel 54. However, when the gas in the cylinder head explodes it blows downwardly between the web portion 52 of the hanger and the gate 33, thus giving a larger passage for the transmission of gas to the portion of the cylinder below the channel 26. The downward blast of the gas to the crank chamber is prevented by the packing 56 in the lower part of the hanger. The piston therefore is thrust laterally by this side pressure of gas, and such action compensates for the side thrust on the piston due to the angularity of the crank shaft on the power stroke.

The water circulation is through the spaces 18 in the main body of the cylinder and such circulation passes through the opening 19 in the cylinder and circulates through the passages 27 and 28 of the cover, thus effectively cooling the cover, such passages in the cover extending substantially to the base thereof so that in the downward movement of the piston the gas at the side thereof is subjected to a cooling action.

In Fig. 9 I illustrate a construction suitable for an air-cooled motor in which the cylinder is indicated by the numeral 60, having a slot therein 61 in which fits the hanger 62 on the piston 63. The cover 64 has flanges 65 fitting against the edge 66 of the portion of the cylinder adjacent the slot 61. The cover is provided with an elongated channel or recess 67 similar to the channel or recess 26 in Fig. 5. The cover is held in position on the main body of the cylinder by a series of metal straps 67' which are in any suitable manner drawn taut thus holding the cover in position. The main body of the cylinder is provided with cooling fins 68 and the cover also with cooling fins 69. Therefore, in this air-cooled construction I may readily keep the cylinder and the cover properly cooled.

Various changes may be made in the principles of my invention without departing from the spirit thereof, as set forth in the description, drawings and claims.

I claim:

1. A motor having a cylinder with a slot in one side, a cover forming a closure for said slot, a piston having an obstruction operating in said slot, and means operatively connected to the cover to cool the cylinder adjacent the said slot.

2. A motor comprising in combination a cylinder having an elongated slot in one side, a cover for said slot having a channel therein, a piston slidable in the cylinder and having an obstruction operating in the slot, a lateral movable gate in the channel of the cover, and means operatively connected to the cover to cool the portion of the cylinder adjacent thereto and the cover.

3. A motor comprising in combination a cylinder having an elongated slot on one side, a removable cover secured to the side of the cylinder over the said slot, a combustion chamber at the head of the cylinder, and a piston having a hanger attached thereto on one side with an obstruction on said hanger operating in the said slot.

4. A motor as claimed in claim 3, the cover having a longitudinal channel and a gate transversely mounted therein, the said gate fitting in the said hanger and controlling the flow of gas from the combustion chamber downwardly in the slot in the cylinder.

5. A motor as claimed in claim 3, the cover having a longitudinal channel, a block fixed therein, an elongated gate shiftable transversely of the block, the said block and gate having inter-engaging means, the hanger on the piston being channel shaped and the gate fitting therein to control the passage of gas downwardly in the said slot.

6. In an internal combustion engine, having a cylinder and a piston therein and a combustion chamber above said piston, an elongated slot extending through the walls of the cylinder and communicating with the combustion chamber, a removable cover on the side of the cylinder forming a closure for said slot, and a projection on said piston adjacent its lower end receivable in said slot.

7. In an internal combustion engine as claimed in claim 6, the said cover having means to cool the portion of the cylinder adjacent thereto and to cool the cover.

8. In an internal combustion engine, having a piston and a cylinder, a longitudinal slot in the wall of the cylinder, a removable cover secured to the side of the cylinder forming a closure for said slot, and a projection upon the piston receivable in said slot whereby a side thrust may be applied to said piston.

9. An internal combustion engine comprising in combination a cylinder having a longitudinal slot in one side, a cover forming a closure for said slot, the cover having a channel in alignment with the slot, a combustion chamber at the head of the cylinder, a piston having a channel shaped hanger on one side operating in the said slot with a packing at the bottom having a bearing against a bearing surface on the cover, a gate mounted in the said channel of the cover having a transverse movement to regulate the cross sectional area of the channel of the hanger, and means to control the movement of said gate.

10. An internal combustion engine comprising in combination a cylinder having a longitudinal slot through one side, a cover secured to such side and forming a closure for the slot, the cover having a channel section in alignment with the slot and a flat bearing surface below said channel, a combustion chamber at the head of the cylinder, a piston having a channel shaped hanger operating in the slot with a packing at the lower end to bear on the bearing surface of the cover, a block fitted in the channel, a transversely movable gate inter-engaging with the block and shiftable into the channel of the hanger, and means to control the movement of said gate.

11. An internal combustion engine as claimed in claim 10, the means to control the movement of the gate comprising a stem secured thereto and extending outwardly through an opening in the block and in the cover, a spring on the stem, a plate secured to the cover against which the spring bears, and an abutment means on the stem engaging the opposite end of the spring.

12. An internal combustion engine having a cylinder with a longitudinal slot through one side, a cover forming a closure on such side, and a piston having an obstruction operable in said slot, the cylinder having a water jacket, the cover having a water jacket, there being communicating openings between the jacket of the cylinder and the cover.

13. An internal combustion engine comprising in combination a cylinder having a longitudinal slot in one side, a cover forming a closure for such side, the cover having a channel therein, a piston having an obstruction operating in the said slot, and a gate transversely slidable in the channel of the cover adapted to restrict the cross sectional area of the said slot, the cylinder and the cover having water jackets with a communicating opening from the water jacket of the cylinder to that of the cover.

In testimony whereof I have signed my name to this specification.

C. G. EDWARDS.